United States Patent [19]
Sweeney et al.

[11] Patent Number: 5,146,526
[45] Date of Patent: Sep. 8, 1992

[54] LASER PIGTAIL ASSEMBLY AND METHOD

[75] Inventors: Kevin L. Sweeney, Naperville; Michael R. Keur, Des Plaines, both of Ill.

[73] Assignee: Amoco Corporation, Chicago, Ill.

[21] Appl. No.: 685,222

[22] Filed: Apr. 12, 1991

[51] Int. Cl.⁵ .................................. G02B 6/36
[52] U.S. Cl. ..................................... 385/90
[58] Field of Search ........................ 385/90–94

[56]  References Cited
U.S. PATENT DOCUMENTS

| 4,119,363 | 10/1978 | Camlibel et al. | 385/91 X |
| 4,296,998 | 10/1981 | Dufft | 385/91 |
| 4,762,386 | 8/1988 | Gordon et al. | 385/93 X |
| 4,779,947 | 10/1988 | Ito | 385/93 |
| 5,073,002 | 12/1991 | Hockaday | 385/49 |

Primary Examiner—Akm E. Ullah
Attorney, Agent, or Firm—James A. Gabala; William H. Magidson; Frank J. Sroka

[57]  ABSTRACT

Apparatus comprising: a first member having one end through which laser light is emitted; a second member, spaced apart from said first member and having a mating end, for receiving said laser light from said first member, said mating end having an edge which is generally adjacent to an edge at said one end of said first member; and solder joining means, carried by said edges of said first member and said second member, for joining said first number and said second number.

21 Claims, 2 Drawing Sheets

LASER PIGTAIL ASSEMBLY AND METHOD

TECHNICAL FIELD

This present invention relates to lasers and laser systems in general, and, in particular, to optical pigtail assembly for a laser and its method of manufacture.

BACKGROUND OF THE INVENTION

Optical pigtail assemblies are used for coupling the output from an optical source, such as a light emitting diode, a diode laser or a diode laser pumped solid-state laser, to an optical waveguide, such as a fiber optic cable or the like. The optical waveguide is positioned within the laser pigtail assembly for maximum optical power transfer from the optical source to the waveguide.

In a typical single mode laser pigtail assembly, a laser source, usually contained in a metal can or housing, is mechanically carried by a base member. A lens, such as a gradient index, plano-convex lens or a spherical lens, is fixedly positioned adjacent to a window in the laser source housing. When using a plano-convex lens, the convex end of the lens is typically positioned towards the laser to focus the output of the laser source. A cap member is mechanically placed over or adjacent to the laser source and the lens. The cap member has a central aperture into which is secured an optical fiber waveguide. The optical fiber can be placed directly into the aperture or, alternately, the fiber can be placed in a ferrule and then secured in the aperture. The optical fiber and the cap member are positioned with respect to the output of the laser source for maximum optical power transfer from the laser source to the optical fiber and then welded together using a precision laser welding tool (e.g., flash welding).

An alternative method of manufacturing such a laser pigtail assembly is to use an adhesive, such as a long-term-curing epoxy, to hold together the various parts. The manufacturing steps are somewhat similar to the previously described process in that the optical fiber is aligned with respect to the laser source for maximum power transfer. In the long-term-curing epoxy process, a layer of epoxy, on the order of 50 microns in thickness, is applied between the parts being bonded. The assembled parts are then set aside until the epoxy is cured.

U.S. Pat. No. 4,969,702 to Anderson describes an improved epoxy process. There, an optical pigtail assembly is manufactured using an ultraviolet (UV) cured epoxy, wherein the thickness of the UV cured epoxy between the bonded elements is on the order of 10 microns and the epoxy is exposed to ultraviolet light after each assembly step to promote curing. In particular, a diode laser is fixedly positioned on a support member; a focusing member, such as a gradient index lens, is fixedly positioned with respect to the diode laser so that the output of the diode laser passes through the focusing member; a cap member having a central aperture therein and a mounting surface normal to the aperture is positioned over the diode laser and the focusing member with the mounting surface in contact with the support member; an optical waveguide, such as a fiber optic cable, is positioned within the central aperture of the cap member; and the cap member and the optical waveguide within the cap member are fixedly positioned with respect to the output of the diode laser passing through the focusing member to provide maximum optical power transfer between the diode laser optical source and the optical waveguide.

Those skilled in the art understand that the dimensional positions of the laser source, the lens and the optical fiber are critical and must be maintained during the manufacturing process. There are at least two techniques which which can be used to achieve these critical tolerances.

One technique is to accurately manufacture the parts required to make the fiber/laser assembly, such that, when the parts are brought together, physical contact is made among the parts. The parts in contact can be secured using a variety of methods, such as laser-welding. The major disadvantage of this scheme is the high tolerance requirements on the components that are used in the assembly.

A second technique is to relax the mechanical tolerances of the components. These components are then brought into close proximity during assembly with gaps between the components to be joined. These gaps are then filled with an epoxy or similar substance. The disadvantage of this scheme is an epoxy can expand or contract during the curing or cooling process and change the accurate placement of the components that are being assembled.

Low volume production is another disadvantage of using ordinary epoxies, since substantial curing time (e.g., 16 hours) is required for each assembly step. In addition, both the epoxy process and the laser welding process require large capital investments. For many epoxy processes, a humidity and vibration controlled room is required while the laser welding process requires expensive laser welding machines. UV-cured epoxy provides some advantages over other methods of assembly, since the thickness of the epoxy layer between adjacent parts is thinner and the bond is generally immune from environmental problems (such as moisture absorption) associated with other kinds of epoxies (such as longer-curing, gyro grade epoxies). However, almost all epoxies have some shrink, creep and expansion effects. Moreover, the parts must be bought very close to each other and positioned very acurately for a UV cured epoxy to work. In addition, stainless steel members are used with the UV epoxy; stainless steel has high thermal conductivity and has a relatively high thermal coefficient of expansion relative to glass. Brass also has the same problem. Finally, if a mistake is made in using an epoxy, the assembly cannot be easily repaired.

What is needed is an optical pigtail assembly which has high optical power coupling efficiency, which has good thermal performance and which can be manufactured using a high output and low cost method that does not require large capital investment.

SUMMARY OF THE INVENTION

A general object of the invention is to provide a laser optical pigtail assembly and a method for forming such an assembly.

Yet another object of the invention is to provide an assembly process for joining a fiber optic pigtail to a diode-pumped solidstate laser or other laser light source.

Still another object of the invention is to provide a laser pigtail assembly which is easily assembled and which does not require expensive equipment.

One specific object of the invention is to provide a method and laser pigtail assembly which is aligned for maximum power transfer and which is held in position using solder.

In accordance with the present invention, there is provided a fiber optic pigtail assembly comprising: a first member having one end through which laser light is emitted, said one end having an edge; a second member, spaced apart from said first member and having a mating end, for receiving said laser light from said first member, said mating end having an edge which is generally adjacent to said edge of said one end of said first member; and solder joining means, carried by at least a portion of said edges of said first member and said second member, for joining together said first member and said second member.

One important advantage of the present invention is that the manufacturing process does not require environmentally controlled rooms for assembly or expensive equipment for joining the various parts. Moreover, the solder joining means results in a long term mechanically and thermally stable bond. In addition, the use of solder and the absence of a need to put the two parts very close to eachother, allows one to relax, somewhat, the tolerances of the mechanical parts.

Numerous other advantages and features of the present invention will become readily apparent from the following detailed description of the invention, the embodiments described therein, from the claims, and from the accompanying drawings.

Figure 1:
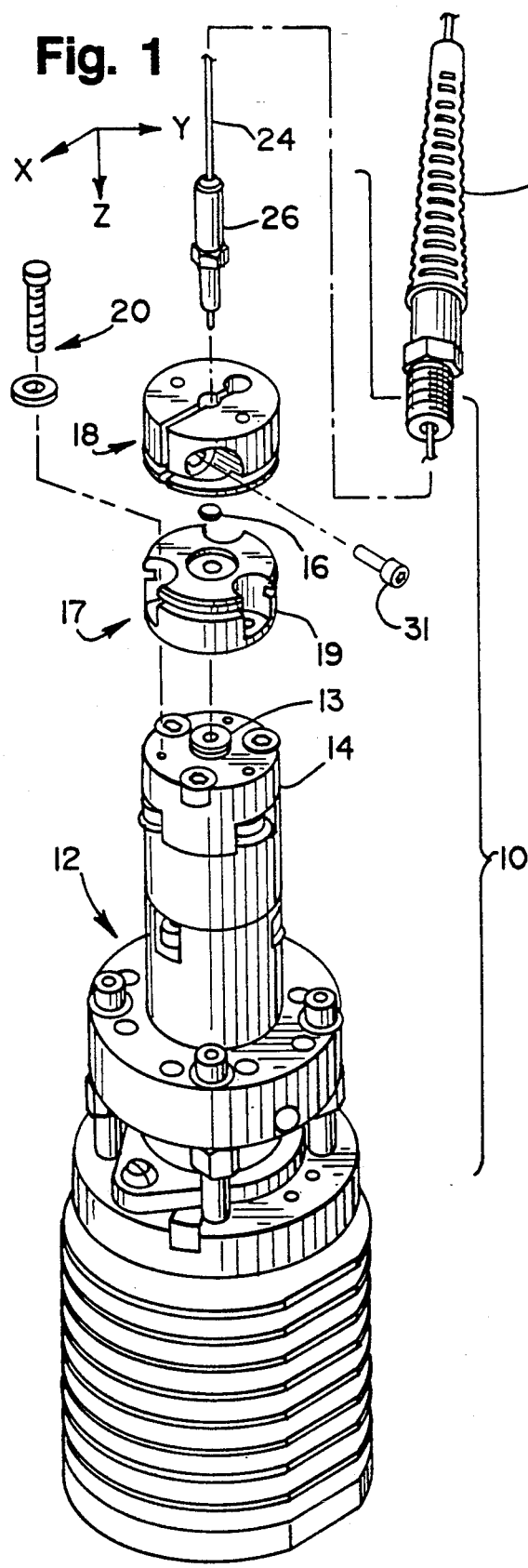
FIG. 1 is an exploded perspective drawing of the laser pigtail assembly that is the subject of the present invention.
Figure 2A:
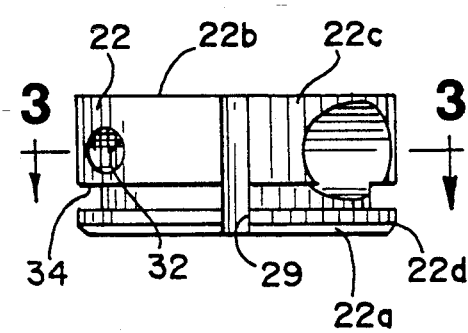
Figure 2B:
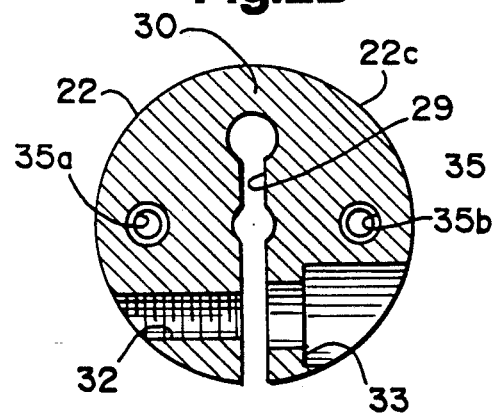
Figure 2C:
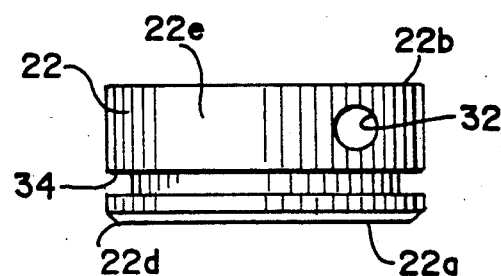
Figure 3:
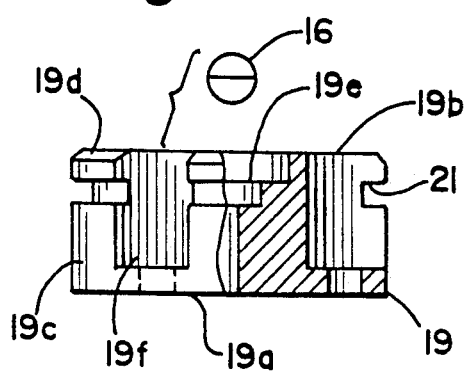
Figure 4A:
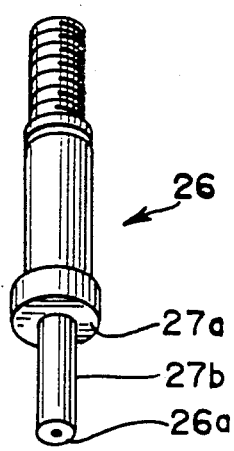
Figure 4B:
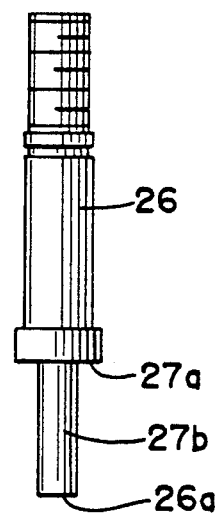
Figure 5:
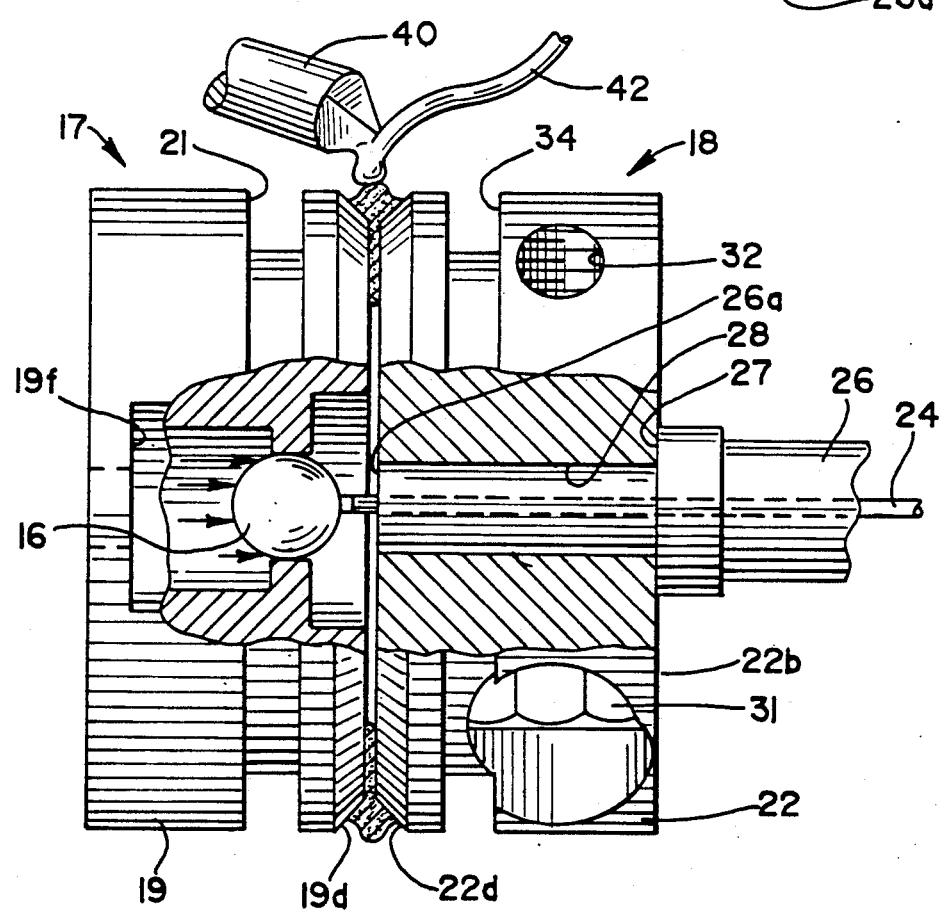

FIG.'s 2A, 2B and 2C are cross sectional, side and top views of the ferrule disk which is shown in FIG. 1;

FIG. 3 is a cross sectional side view of the focusing lens disk assembly which is shown in FIG. 1;

FIG.'s 4A and 4B are side and perspective views of the ferrule shown in FIG. 1; and FIG. 5 is a partial, enlarged cross sectional view of the ferrule disk and focusing lens disk assembly showing their relative positions while being joined together.

DETAILED DESCRIPTION

While this invention is susceptible of embodiment in many different forms, there is shown in the drawings, and will herein be described in detail, one specific embodiment of the invention. It should be understood, however, that the present disclosure is to be considered an exemplification of the principles of the invention and is not intended to limit the invention to the specific embodiment illustrated.

APPARATUS

Referring to the FIG. 1, there is shown an optical pigtail assembly 10 comprising: an optical source or base assembly 12, such as a diode laser, pumped, solid state laser 13 fixedly positioned on a support member 14; a focusing lens disk assembly 17; a ferrule disk assembly 18; and a fiber optic waveguide 24. The free end of the fiber optic includes a strain relief boot 24c.

The laser source 12 is contained in a metal housing having a window therein for outputting the laser light. In optical telecommunications transmissions, the laser source 12 generates an optical output generally at wavelengths of 1300 nm and 1550 nm for single mode transmissions and 850 nm for multimode transmissions. In one specific embodiment a 75 mW Whisper ® infrared laser (made by the Amoco Laser Company of Naperville, Ill.) was used.

A focusing member 16, such as a spherical (ball) lens or a gradient index lens, is positioned with respect to the optical source 12 such that the output from the laser 13 passes through the lens 16. In one preferred embodiment of the invention, a ball lens 16 is positioned relative to the source 12 so that the light output from the laser source impinges on the lens 16. This configuration provides high coupling efficiency from the laser source 12 to both single mode and multimode optical fibers.

The function of the disk assembly 17 is to properly position the lens 16 relative to the laser source 12. The disk assembly 17 comprises a disk-like support number 19 which is joined to the optical source 12 by threaded fasteners 20 (e.g., a socket head cap screw and a belleville washer). A cross-sectional side view of the support member 19 is shown in FIG. 3. The support member 19 is generally cylindrical in shape and has two opposite flat ends 19a and 19b and a cylindrical side wall 19c. The upper end (according to the orientation of FIG. 3) of the side wall 19c contains a circumferential groove 21 of rectangular cross-section. The upper end and the side wall 19c has a chamfered edge 19d and a seating surface 19e for receiving the focusing lens 16. Preferrably the supporting member 19 is made from a metal, like IN-VAR-36 ® alloy, which has low thermal conductivity, a low thermal expansion coefficient and which is easy to machine.

The ferrule disk assembly 18 is positioned adjacent to the laser source 12 and the lens 16. The ferrule disk assembly 18 comprises a disk-like mating member 22 (See FIG.'S 2A, 2B and 2C) and a ferrule 26. The mating member 22 has two opposite flat ends 22a and 22b and a cylindrical side wall 22c. An optical waveguide 24, such as a fiber optic cable, is located within a ferrule 26 and positioned within the central aperture 28 of the mating member 22. The mating member 22 has a deep radial slot 29 which extends between its opposite ends and through the central aperture 28. As such, the slot 29 defines two opposite mating portions which are joined together by a relatively thin bridge 30. The two opposite portions of the mating member 22 are drawn together by means of a threaded fastener 31, such as a socket head cap screw. The fastener 31, is located in a bore 32 which is generally at right angles to the slot 29 (See FIG. 3). The head of the fastener 31 is carried by a seating surface 33 on the mating member 22. The mating member 22, like the support member 19, has in its side wall 22c, a circumferential groove 34 of rectangular cross section and an adjacent chamfered edge 22d. In one particular embodiment, the circumferential groove 34 or 21 has a depth 0.060 inches and a width of 0.060 inches. The adjacent end 22a of the mating member 22 is located at a distance of about 0.060 inches from the groove 34. For assembly, the mating member 22 has two threaded bores 35a and 35b.

Turning to FIG.'S 4A and 4B, the ferrule 26 is used to hold the optical fiber 24 within the mating member 22. The particular ferrule 26 shown in the drawings is made by Molex of Des Plaines, Ill. It comes with a strain relief boot 24c, a bayonet coupling nut, a spring and a C-clip; the nut, spring and C-clip are not used in the pigtail assembly of FIG. 1. The ferrule 26 is made from a ceramic (alumina) and has a molded polymeric housing. The ferrule 26 has a shoulder 27a, which abuts a flat end 22b of the mating member 22 (See FIG. 5), and has a nose 27b which fits within the aperture 28 of the mating number. The mating number 22, like the adjacent support member 19, is preferrably made from a metal, such as an INVAR-36 ® alloy, having low thermal expansion (e.g., about 1/10 of carbon steel) and low thermal conductivity.

To position the optical fiber 24 within the ferrule 26, the protective sheating around the optical fiber is removed and the fiber is positioned within a ferrule to have an end of the optical fiber flush with the end 26a of the ferrule. The optical fiber 24 within aperture 28 and the mating member 22 are positioned with respect to the laser source 12 using three degrees of freedom, (i.e., x-, y-, and z-directions of FIG. 1), where the x- and y-directions are in the plane of the two flat end surface 22a and 19b and where the z-direction is parallel to the axis of the central aperture 28, to provide maximum optical power transfer from the laser source 12 to the optical fiber 24. In a single mode laser pigtail assembly, a single mode optical fiber having a core diameter on the order of 9 microns can be used, whereas in a multimode laser pigtail assembly a multimode optical fiber having a diameter in the range of 62 microns can be used.

METHOD

Referring to FIG. 5, the manufacturing process for the above described laser pigtail assembly uses solder for bonding or joining together the two assemblies 17 and 18.

The manufacturing process begins by attaching the laser source 12 to the disk assembly 17. The lens 16 is then fixedly positioned with respect to the laser source 12 so that the output of the laser source passes through the lens 16. The lens 16 can be held in position by a mechanical spring clip or by means of epoxy.

The optical fiber 24 is then prepared for insertion into the central aperture 28 of the mating member 18 as specified by the ferrule manufacturer's instructions (e.g., the protective sheathing around the optical fiber is removed, the fiber is connected to the ferrule 26, and the end face 26a of ferrule in which the optical fiber exposed therein is then polished).

The ferrule 26 containing the optical fiber 24 is then positioned in the central aperture 28 of mating member 22. The ferrule 26 and its optical fiber 24 are secured to the mating member 22 by mechanically clamping it in place using a threaded fastener 31. Alternatively, and epoxy can be used.

The ferrule disk assembly 18 is then located on a micropositioner (e.g., a Model H micropositioner made by the Line Tool Company of Allentown, Pensylvania and having x-, y-, and z-axis of movement, a micropositioner having a tip and a tilt adjustment, etc.) using threaded fasteners inserted into the two bores 35a and 35b in the mating number 22.

The mating member 22 is then positioned (in the x-, y- and z-directions) relative to the laser source 12 and lens 16 with the end face 22a of the mating member at a spaced difference (e.g., about 20/1000 inches) from the support member 19. The end of the optical fiber 24 opposite the ferrule 26 is connected to appropriate test equipment (e.g., a Newport Optical Power Meter, Model 835) for determining the optical power level emanating from the optical fiber 24. Power is applied to the laser source 12 and the optical fiber 24 in the mating member 22 is positioned in the x-, y- and z directions for the maximum power transfer from the laser source to the optical fiber as determined by the optical power level on the test equipment.

When the optical fiber 24 is properly aligned, the adjacent edges 19d and 22d of the two members 19 and 22 are heated using a general purpose soldering iron 40 (e.g., a 60 watt iron having a 700° F. tip). Thereafter, solder 42 (e.g., a CERROTRU 5800-2 or a CERROCAST 4000-4 solder made by Cerro Metal Products Co. of Bellifonte, Pa. and having a melting point of about 280° F.) is applied along the periphery of the adjacent edges 19d and 22d of the mating member 22 and the supporting member 19. Care is taken to keep the adjacent edges at a temperature high enough to obtain a good solder bond. The low thermal expansion coefficient and the low thermal conductivity of the INVAR ® parts keeps the applied heat localized and avoids movement of the two assemblies during bonding. The grooves 21 and 34 formed around the periphery of the supporting member 19 and the mating member 22 provide a relatively thin edge or rim which can be uniformly heated. The grooves as such are not necessary; a good bond has been obtained without them. Preferably, each of the adjacent edges 19d and 22d is prewetted or "tinned" with solder (e.g., lead and tin solder alloy) before the mating member 22 and the supporting member 19 are ready for joining. Applying the solder along alternate opposite edge portions helps issue a uniform bond and avoids movement between the members 19 and 22.

After the solder has cooled, the ferrule disk assembly 18 is released from the micropositioner. The completed assembly is then placed in a protective housing (See U.S. Design Pat. No. 312,445 to Crosby and assigned to the assignee of the present invention).

A method has been described for manufacturing an optical pigtail assembly 10 that uses solder to hold an optical fiber in alignment with a laser source. This method substantially reduces the manufacturing time for such an assembly and produces a laser pigtail assembly that is less susceptible to environmental degradation. Total processing time to join the two sub-assemblies 17 and 18 ranges between 5 and 15 minutes. With experience, a good solder joint can be made in less than 5 minutes. Tests of the solder joint has shown good thermal stability between −40° C. and 70° C., and good vibration stability when subjected to a force of 8.6 g over a frequency range from 0 to 2.5 KHz when a 8 micron single mode fiber at 1300 nm was used. Good coupling efficiency (e.g., about 80%) was shown and bonding losses were measured to be on the order of 0.1 to 1.0 dB.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be utilized. For example, although the invention has been described in the context of a laser as an optical source, the method and apparatus of the invention may be readily used in connecting two fiber optic waveguides and in connecting a fiber optic waveguide source to an appliance or receiver (e.g., a laparoscope) which uses optical radiation. In addition while the pigtail assembly 10 was solder connected using two disk like members 19 and 22 having a peripheral edge, the solder bond can be formed using a variety of adjacent metal surfaces, including adjacent surfaces which are not identical to each other interlocking surfaces and members whose edges carry or are clad with a Nickel-iron alloy. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

We claim:

1. Apparatus, comprising:
   a. a first metal member carrying a diode pumped solid-state laser and an optical focusing element for said laser, having a generally flat end through which laser light is emitted from said focusing element, having a side wall adjacent to said flat end, and having a peripheral edge which is located between said side wall and said flat end;
   b. a second metal member which is spaced apart from said first metal member, which has mating end which carries an optical fiber pigtail having a receiving end which is aligned to receive said laser light from said focusing element, which has a side wall adjacent to said mating end, and which has a peripheral edge which is located between said side wall and said mating end, said receiving end of said optical fiber pigtail and said optical focusing element defining a gap; and
   c. solder joining means, substantially carried by said peripheral edge of said first member and said peripheral edge of said second member, for joining together said first metal member and said second metal member.

2. The apparatus of claim 1, wherein said edge of said first member carries solder wetting means.

3. The apparatus of claim 1, wherein said edge of said second member carries solder wetting means.

4. The apparatus of claim 1, wherein said laser light from said first member is received within a predetermined maximum power transfer receiving zone of said second member.

5. The apparatus of claim 1, wherein said first member and said second member are made from a metal having a low thermal conductivity and a low thermal expansion coefficient.

6. The apparatus of claim 5, wherein said metal is a Nickel-iron alloy and said solder joining means comprises a bismuth and tin fusable alloy.

7. The apparatus of claim 1, further including a ferrule which is removably carried by said second member and which carries said end of said optical fiber pigtail.

8. The apparatus of claim 1, wherein at least one of said side wall of said first member and said side wall of said second member has a groove located adjacent to said flat end of said first member.

9. The apparatus of claim 8, wherein said groove has a generally rectangular cross section.

10. The apparatus of claim 1 wherein said focusing element is a ball lens.

11. The apparatus of claim 1, wherein said solder joining means is located generally around the periphery of said first member and said second member.

12. Apparatus, comprising:
   a. a first low thermal conductivity and low thermal expansion coefficient and generally cylindrical metal member carrying a lens, having a generally flat end through which laser light is emitted from said lens, having a side wall adjacent to said flat end, having in said side wall a circumferential groove which is located adjacent to said flat end and which is of generally rectangular cross section, and having a circumferential and generally circular edge which is located between said groove and said flat end and which carries solder wetting means thereon;
   b. a second low thermal conductivity and low thermal expansion coefficient and generally cylindrical metal member which is spaced apart from said first member, which has a mating end, which carries an optical fiber pigtail having an end which is aligned to receive said laser light from said lens, which has a side wall adjacent to said mating end, which has in said side wall a circumferential channel located adjacent to said mating end and of generally rectangular cross section, and which has a circumferential and generally circular edge which is located between said channel and said mating end and which carries solder wetting means thereon; and
   c. solder joining means, generally carried by said edge of said first member and said edge of said second member, for joining together said first member and said second number.

13. The apparatus of claim 12, further including a ferrule which is removably carried by said second member and which carries said end of said optical fiber pigtail.

14. An optical coupling assembly, comprising:
   a support member, adapted to carry an optical source, for launching light through a mounting surface; and
   a mating member, adapted to carry an optical receiver, for receiving light from said support member through a mating surface, said mating surface of said mating member being positioned relative to said mounting surface of the support member to align said optical receiver to said optical source and provide optimum power transfer from said optical source to said optical receiver, said mating member and said support member being bonded together by solder, said optical receiver comprising a ferrule member having a central aperture for carrying a optical waveguide therein, said ferrule member being positionable within said central aperture to provide a third degree of positioning freedom, the positioning of said ferrule member within said mating member and the positioning of said mating member relative to said mounting surface providing three degrees of positioning freedom prior to soldering.

15. The assembly of claim 14, further including a spherical lens, carried by an aperture located in said mounting surface of said support member, for focusing the output of said optical source.

16. The assembly of claim 14, wherein said support member and said mating member have adjacent edges made from a low thermal conductivity and low thermal expansion coefficient metal alloy.

17. The assembly of claim 16, wherein said support member and said mating member have edges carrying a Nickel-iron alloy.

18. A method, comprising the steps of:
   (a.) fixedly positioning a first member having one end through which laser light from a source is emitted and having a peripheral edge;

(b.) adjustably positioning a second member at a spaced distance from said one end of said first member for maximized power transfer of said laser light from said first member to an end of a fiber optic which is carried by said second member, which receives said light from said first member and which is at a spaced distance from said source of laser light, said second member having a mating end for mating with said first member and having a peripheral edge; and (c.) joining said first member and said second member using solder means applied substantially to at least a portion of opposite adjacent peripheral edges of said first member and said second member.

19. The method of claim 18, wherein step (a) includes the step of pre-wetting said edge of said first member for receiving heated metal solder thereon.

20. The method of claim 18, wherein step (b) includes the step of pre-wetting said edge of said second member for receiving heated solder thereon.

21. The method of claim 18, wherein step (a) includes the step of locating within said second member a focusing member for transmitting laser light therethrough.

* * * * *

UNITED STATES PATENT AND TRADEMARK OFFICE
CERTIFICATE OF CORRECTION

PATENT NO. : 5,146,526
DATED : September 8, 1992
INVENTOR(S) : Kevin L. Sweeney and Michael R. Keur It is certified that error appears in the above-indentified patent and that said Letters Patent is hereby corrected as shown below:

| Col. | Line | |
|---|---|---|
| Abstract | 9 | "second number" should read --second member-- |
| 2 | 64 | "solidstate laser" should read --solid-state laser-- |

Signed and Sealed this

Twenty-sixth Day of October, 1993

Attest:

BRUCE LEHMAN

*Attesting Officer*     Commissioner of Patents and Trademarks